United States Patent [19]
Hong

[11] Patent Number: 5,901,623
[45] Date of Patent: May 11, 1999

[54] CRYOGENIC MACHINING

[75] Inventor: Shane Y. Hong, New York, N.Y.

[73] Assignee: The Edison Materials Technology Center, Kettering, Ohio

[21] Appl. No.: 08/718,994

[22] Filed: Sep. 24, 1996

Related U.S. Application Data

[63] Continuation-in-part of application No. 08/287,863, Aug. 9, 1994, abandoned.

[51] Int. Cl.$^6$ ..................................................... B23B 27/10
[52] U.S. Cl. ..................................... 82/50; 407/2; 407/11; 407/100
[58] Field of Search ................................. 407/11, 2, 3, 4, 407/5, 6, 114, 115, 100; 408/56, 61; 82/1.11, 50, 173

[56] References Cited

U.S. PATENT DOCUMENTS

| | | | |
|---|---|---|---|
| 522,588 | 7/1894 | Chouteau | 407/11 |
| 2,292,973 | 8/1942 | Richards | 88/40 |
| 2,643,579 | 6/1953 | Jacoby, Jr. | 88/40 |
| 2,683,303 | 7/1954 | Pigott | 29/106 |
| 2,848,790 | 8/1958 | McMann | 29/106 |
| 3,077,802 | 2/1963 | Philip | 82/1 |
| 3,220,290 | 11/1965 | Shandon | 83/171 |
| 3,577,808 | 5/1971 | Visser | 408/61 |
| 3,605,551 | 9/1971 | Steward | 90/11 |
| 3,673,904 | 7/1972 | Cooper et al. | 83/171 |
| 3,732,768 | 5/1973 | Hodsen et al. | 83/171 |
| 3,900,975 | 8/1975 | Lightstone et al. | 51/322 |
| 3,971,114 | 7/1976 | Dudley | 29/106 |
| 4,047,826 | 9/1977 | Bennett | 407/11 X |
| 4,262,567 | 4/1981 | Bettin | 83/171 |
| 4,535,216 | 8/1985 | Cassidenti | 219/68 |
| 4,667,390 | 5/1987 | Acharya et al. | 29/455 R |
| 4,791,840 | 12/1988 | De Rosier et al. | 407/11 X |
| 4,829,859 | 5/1989 | Yankoff | 82/1.11 |
| 4,934,609 | 6/1990 | Lindauer et al. | 241/3 |
| 5,048,300 | 9/1991 | Lihl | 62/48.1 |
| 5,103,701 | 4/1992 | Lundin et al. | 82/173 |
| 5,439,327 | 8/1995 | Wertheim | 407/11 |

FOREIGN PATENT DOCUMENTS

| | | | |
|---|---|---|---|
| 0 100 376 | 2/1984 | European Pat. Off. | |
| 30 04 166 | 8/1980 | Germany | |
| 3740814 | 6/1989 | Germany | 407/11 |
| 59-73257 | 4/1984 | Japan | |
| 444616 | 2/1968 | Switzerland | 407/11 |
| 2408 | 8/1972 | United Kingdom | |
| WO8403239 | 8/1984 | WIPO | 407/11 |

OTHER PUBLICATIONS

Z. Zhao et al. "Cooling Strategies for Cryogenic Machining from a Materials Viewpoint", *Journal of Materials Engineering and Performance*, vol. 1, No. 5, Oct. 1992, pp. 669–677.

*Primary Examiner*—Frances Han
*Assistant Examiner*—Henry W. H. Tsai
*Attorney, Agent, or Firm*—Thompson Hine & Flory LLP

[57] ABSTRACT

An apparatus for cutting chips from a workpiece includes a cutting tool having a rake face and a flank face, the rake face including a cutting edge. A chip breaker is positioned adjacent the rake face for lifting a chip from the rake face after the chip is cut from the workpiece. A supply head is positioned adjacent the chip breaker and a chamber for receiving cryogenic coolant may be formed between the supply head and the chip breaker. A primary nozzle is positioned for directing cryogenic coolant from the chamber onto the rake face and under the chip cut from the workpiece. The primary nozzle may be formed by one or more nozzle channels recessed into the rake face of the cutting tool. A secondary nozzle positioned adjacent the flank face of the cutting tool for directing cryogenic coolant from the chamber onto the flank face of the cutting tool may be provided, wherein access of the secondary nozzle to cryogenic coolant from the chamber is determined by movement of the supply head between first and second positions with respect to the chip breaker.

9 Claims, 8 Drawing Sheets

CRYOGENIC MACHINING

This application is a CIP of 08/287,863 filed Aug. 9, 1994, now abandoned.

BACKGROUND OF THE INVENTION

The invention relates to an apparatus and method for cryogenically cooling a cutting tool. More particularly, the invention relates to a cutting tool which provides cryogenic cooling to the point of the tool which experiences the highest temperature during cutting and a method thereof. Furthermore, the invention is drawn to a chip breaker which contains a channel for cooling the tool.

Metal cutting or machining is a chip forming process. When the cutting tool engages a rotating workpiece with a fixed feed, a chip of material is formed by the tool penetrating into the workpiece. The chip formation involves two mechanisms referred to as primary deformation and secondary deformation. The process of primary deformation is actually a shearing process. The chip is fragmented from a ductile workpiece but rejoins itself, forming a continuous chip. Then friction between the chip and tool face deforms the bottom side of the chip, a process referred to as secondary deformation in the friction zone. Heat build up, as a result of this friction, increases the temperature of the tool drastically and concentrates the heat at the interface of the chip and the tool face. As the chip slides on the tool face, the temperature continues to increase until the contact pressure between the chip and tool drops. The highest temperature is experienced at a point along the tool face, also known as the rake face, but at a small distance from the cutting edge of the tool, as shown in the sample temperature distribution of FIG. 1 for normal conventional machining. The highest temperature point usually coincides with the area where crater wear occurs, a distance from the tool corner. This distance is approximately equal to the undeformed chip thickness or feed. Because of this high temperature, the cutting tool could overheat decreasing the tool life, increasing the force required to cut the surface and decreasing cutting accuracy.

When cutting ductile materials such as soft aluminum or low carbon steels, the heat causes a "stickiness" which produces material build-up on the edge of the cutting tool also, known as "welding." Conventionally, this problem has been solved by applying cutting fluid or cutting oil in a flood or mist directly to the back-side of the chips, the side opposite the cutting tool. This served as both a coolant and a lubricant. These cutting fluids however, resulted in a bad odor, water penetration into the machine bearings, and sanitary problems. In addition, they are prone to damaging the environment and may even cause health hazards.

The application of cryogenic fluid to cool the metal cutting process started as early as the 1950's. The cryogenic fluids used were $CO_2$, freon, or solvenlene. They were sprayed in the general cutting area or were applied to the workpiece before cutting in a prechill. This method, however consumed excessive amounts of cryogenic fluid and had no lubrication effect. It has been demonstrated that it is generally undesirable to cool the workpiece by the cooling power of the liquid gas. In general, the strength of the workpiece material increases as the temperature drops, and the material becomes harder. Therefore, the tool requires more force to cut the harder material and the material becomes more difficult to machine.

Two known methods of using cryogenic fluids to cool the cutting tool are shown in patents to Philip and Dudley. As explained below, neither of these methods cool the face of the tool where the highest temperatures are encountered. Both cool the interior or backface of the tool.

U.S. Pat. No. 3,077,802 to T. B. Philip discloses carbon dioxide in the form of a liquid, gas or snow to cool the interior of a cutting tool. The carbon dioxide is allowed to expand into the vicinity of the cutting edge. A hole is provided in the middle of the cutting tool and a capillary is used to transport the carbon dioxide. Smaller holes are drilled to the tool surface for escape of gases. However, the cryogenic fluid does not reach the point of highest temperature in the tool and this has been proven to be unsatisfactory for the much higher cutting speeds used today.

U.S. Pat. No. 3,971,114 to G. M. Dudley discloses a cryogenic fluid routed through the tool which is discharged in a stream between the cutting edge and the workpiece when cutting. However, in Dudley, the cryogenic gases are not injected to the point of highest temperature and therefore, the effectiveness of the coolant is reduced. Secondly, in Dudley, carbon dioxide is injected at the interface between the cutting edge and the workpiece (i.e. at the backside of the tool). The coolant alone is used to cool the tool from the side surface, which is not the highest temperature area, thereby making the cooling comparatively ineffective. In addition, the workpiece cooling is not desirable and there is no lubrication effect provided by the methods as shown in Dudley or Philip.

With the improvement of machining technology, the cutting speed is generally much higher than in the past, the heat build up is greater, and the cutting temperature is so high that cooling by the indirect cooling methods of the prior art is no longer effective to cool the high temperatures. The method and apparatus of the present invention provide a practical solution for the improved machining of materials including high speed steel alloys, aluminum, titanium, low carbon steels, and composites.

Since the advent of carbide tools and the use of high cutting speeds, the continuous chips described above, produced in metal cutting have presented serious problems. At lower cutting speeds, these chips usually have a natural curl and tend to be brittle. However, cutting speeds have increased to such an extent that chip control is a necessity. In turning operations, where the tool is continuously removing metal for long periods, a continuous chip can become entangled with the tool, the workpiece, or the machine tool elements. This type of chip can be hazardous to the operator and, unless controlled properly, it can result in mechanical chipping of the cutting edge. In addition, the handling of long, continuous chips can present a major economic problem. For example, handling characteristic of chips can be expressed by their bulk ratio; namely, the total volume occupied by the chip divided by the volume of solid chip material. Unbroken, continuous chips have a bulk ratio of approximately 50. Tightly wound chips have a bulk ratio of approximately 15. Well-broken chips have a bulk ratio of approximately 3. The volume occupied by well-broken chips is, therefore, about one-seventeenth the volume of unbroken chips, a considerable advantage when it comes to handling and disposal.

When the chips are formed they have long grain structures, traverse to the direction of cutting. However, as the chip rubs the surface of the workpiece, the grain structure on the lower surface bends to form a "long tail" due to secondary deformation and the heat build up, as shown in FIG. 2. This lower surface then recrystallizes due to the grain structure and intense heat. This recrystallized area is highly undesirable since it is more difficult to have smaller, broken chips.

This invention has a special advantage in improving the chip breaking. The method of improving chip breaking for ductile material is through the following mechanisms: a) increasing the brittleness of the chip material by the low temperature application of the cryogenic coolant, b) reducing the secondary deformation that occurs at the bottom surface of the chip which rubs on the tool face, c) reducing the long tail in the grain structure of the chips, which is a major cause of the difficulty in breaking ductile chips, d) avoiding the welding or recrystallizing of the bottom layer of the chip (to avoid the strong bonding of chip structure which adds to the difficulty in chip breaking) by the coldness and reduction of the secondary deformation, and e) bending and curling the chip for breaking by the use of both a mechanical chip breaker and the pressure from the cryogenic fluid. This may occur when the liquid expands into gas within the nozzle.

Another problem encountered in conventional machining of soft, sticky, ductile materials, is the friction between the chip and the tool becomes so great that the chip material welds itself to the tool face. The presence of this welded material further increases the friction, and this friction leads to the build up of layer upon layer of chip material. The resulting pile of material is referred to as a build-up edge. The build-up edge often continues to grow and then breaks down when it becomes unstable, and the broken pieces are carried away by the underside of the chip and the new workpiece surface. The resulting workpiece surface is rough. Actually, build-up edge formation in metal cutting is the principal factor affecting surface finish and can have a considerable influence on premature failure of the cutting tool and cutting tool wear. This occurs because the build-up will accumulate on the tool face and pull the tool causing the tool to fall apart due to the two different thermal expansions of the two metals.

In this invention, however, the build-up edge formation is automatically prevented by injecting the super cold cryogenic fluid to the cutting tip area. This reduces the adhesion of the chip material to the tool tip which lowers the temperature in the cutting zone and prevents the welding phenomenon. Also, this invention can clean and remove the possible build-up edge with the cryogenic jet. Because the build-up edge is the main cause of poor surface quality, the method of the present invention also indirectly improves the finish of the machined surface. Therefore, it is an object of the present invention to provide a cutting tool which injects liquid nitrogen or other liquified gas as close as possible to the highest heat affected area of the cutting tool, not the workpiece, through a nozzle, between the chip and the tool face. This provides a fluid cushion which reduces the friction of the chip rubbing on the tool face, and reduces the cutting force involved, as well as the abrasive wear. Furthermore, a chip breaker is used to slightly lift up the chip so that coolant can penetrate to the highest temperature area and reduce the contact length of the chip on the tool face. This will improve the penetration of coolant to the cutting zone. Thus friction between the chip and the tool face is greatly reduced and therefore, heat due to the frictional deformation is greatly reduced.

SUMMARY

In accordance with the present invention a cutting tool is provided for cutting a workpiece while being able to provide a cryogenic coolant in order to prolong the life of the tool, which comprises a cutting tool having a rake face and a flank face, a chip breaker adjacent to the rake face, and a nozzle for directing a coolant onto a discrete area of the rake face at the point of highest temperature and under chips cut from the workpiece. The nozzle is formed between the rake face of the tool and the chip breaker.

In accordance with a further aspect of the present invention, a method of cryogenically machining a metal work piece is provided which comprises the steps of providing a cutting tool having a rake face, a flank face and a chip breaker, contacting the work piece with the cutting tool, forming a chip by penetrating the cutting tool into the workpiece, lifting the chip formed from the step of cutting of the workpiece with the chip breaker; and directing a coolant through a nozzle between the chip breaker and the cutting face to cool the tool. Preferably, a dual-nozzle delivery system has shown significant tool life improvements with reduced coolant consumption.

In accordance with a further aspect of the invention, a chip breaking apparatus is provided which comprises a top surface, a bottom surface, at least one angled side surface for bending a chip of machined work piece past its breaking point, a through hole formed from the top surface to an intersection of the bottom surface and the angled side surface for transmitting cryogenic fluid or refrigerated air to cool the chip breaking apparatus and injecting the cryogenic fluid or refrigerated air under the chip of machined work piece.

DESCRIPTION OF THE PREFERRED EMBODIMENT

The present invention is directed to cryogenic machining of a workpiece wherein cryogenic liquified gas is directed as close as possible to the highest heat affected area of the tool by means of a nozzle. The nozzle allows the coolant to be applied in such a direction and position in the cutting zone that a maximum cooling effect can be obtained. Furthermore, a chip breaker is used which slightly lifts the chip so that the coolant can penetrate to the highest temperature area. The chip breaker serves to help break the otherwise continuous chip by changing the direction of the chip flow. The chip breaker also acts as the primary nozzle and leads the cryogenic fluid to the tool-chip interface. Therefore, the mounting position of the chip breaker is required to produce both good chip breaking and effective penetration of the cryogenic fluid into the tool-chip contact area. The cryogenic fluid absorbs the heat, thus effectively cooling the cutting tool. In addition, gas pressure from the fluid lifts the chip and reduces the heat build-up caused by friction between the chip and the tool or rake face. With this invention, the liquified gas is jetted through a nozzle, and injected directly to the cutting zone, between the chip and the tool face.

The nozzle of the present invention is designed to provide liquified gas between the chip breaker and rake face of the tool insert, providing an effective way to supply liquified gas or other suitable coolants to the cutting zone at, or very close to, the highest temperature point along the tool face for the most efficient removal of the heat build-up incurred during the machining process. By directing liquified gas directly on the surface of the tool face, rather than the material to be cut, it reinforces the hardness of the tool, and the tool face becomes more wear resistant, resulting in longer tool life.

Figure 1:
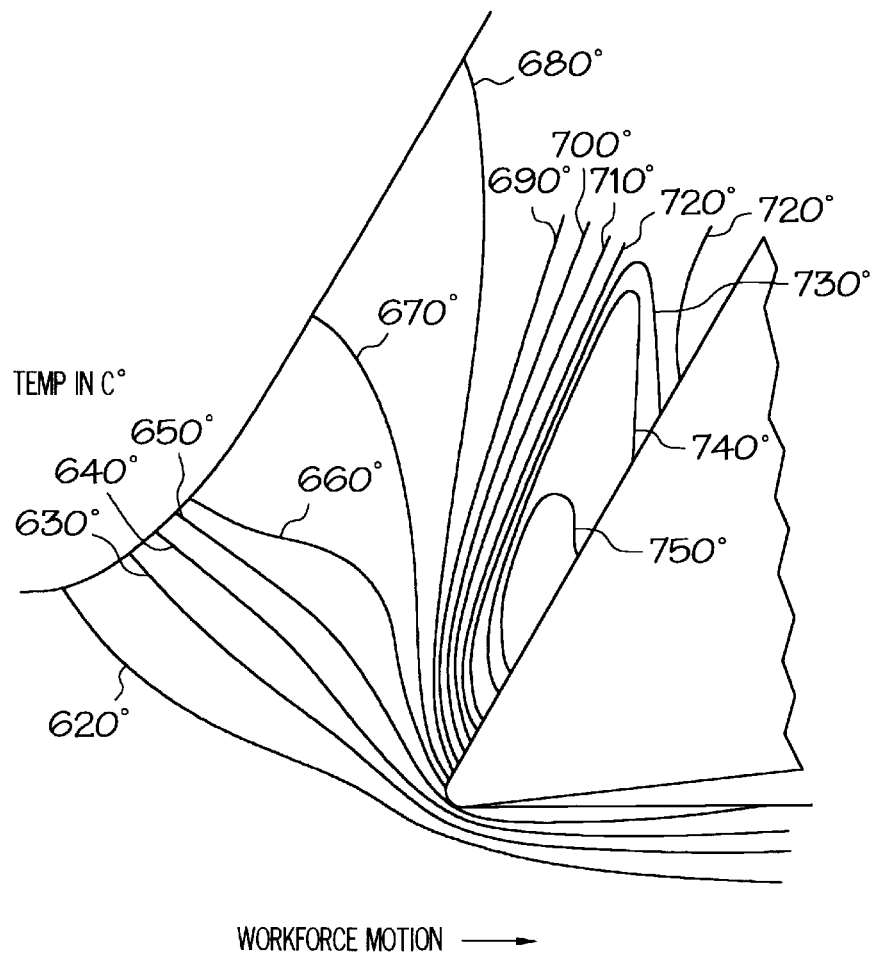
FIG. 1 is a temperature distribution during conventional metal cutting.
Figure 2:
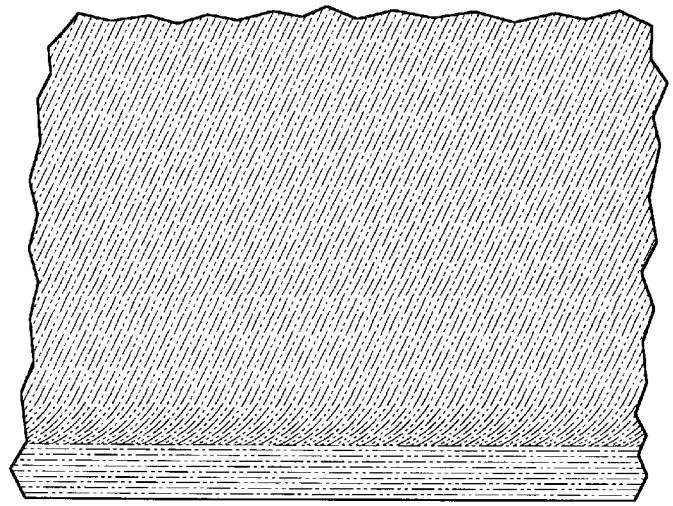
FIG. 2 is a microstructure of a chip.
Figure 3:
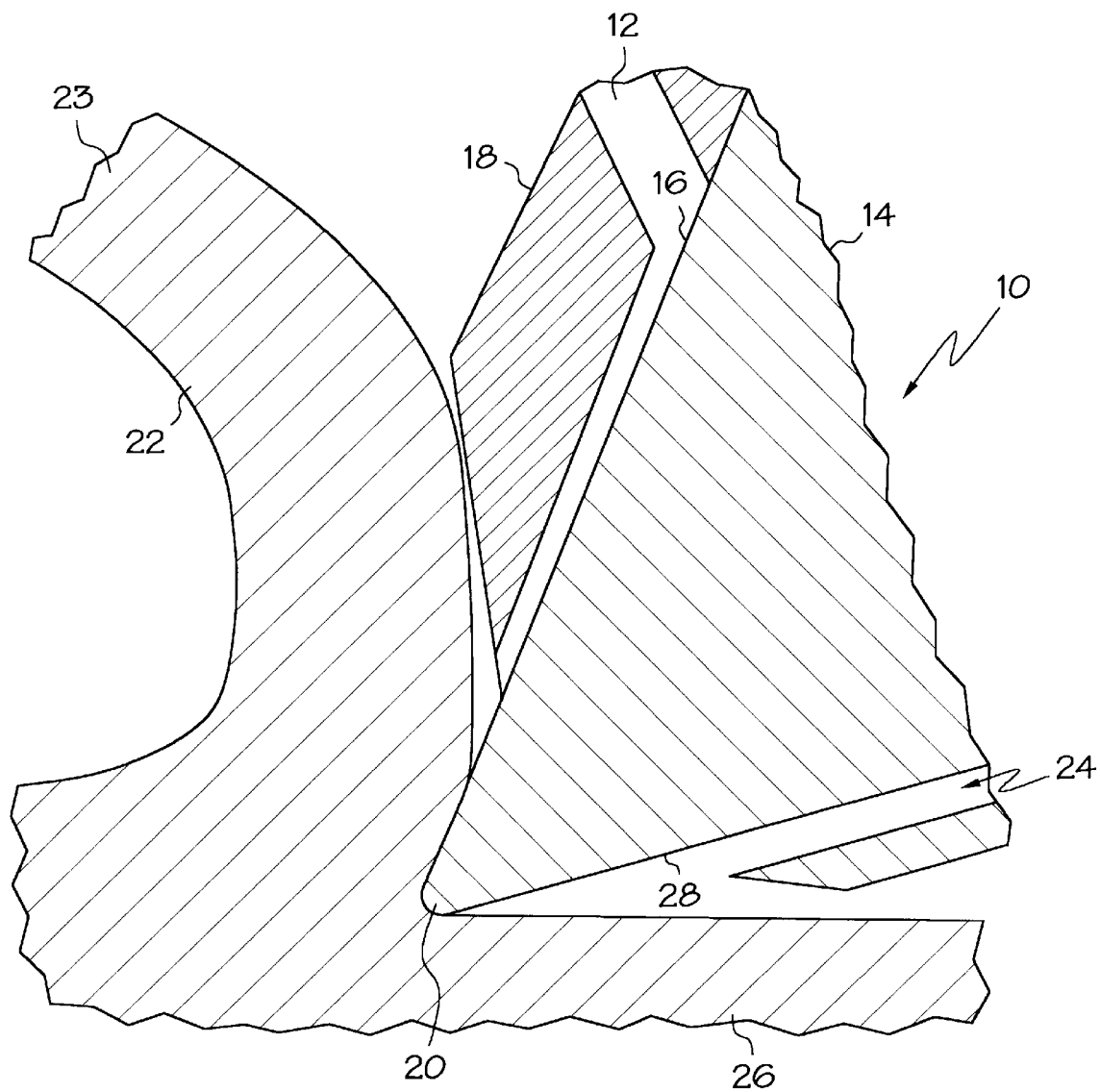
FIG. 3 is the apparatus of the present invention.

As seen in FIG. 3, the primary nozzle 12 is formed by a channel between the tool face 16 of the cutting tool 14 and the chip breaker 18. From a chip breaking point of view, it is required that the chip breaker bend the chip properly and produce a chip curling radium so that the free end of the chip flow 23 happens to strike back to one of the surfaces on the workpiece and tool. For a given feed rate and cutting depth, this requirement can be fulfilled only for a certain range of the distance between the chip breaker and tool cutting edge. On the other hand, in order for the coolant jet to penetrate into the tool-chip interface, the chip breaker should be positioned close to the cutting edge so that it lifts the chip up from the tool rake. But, if mounted too close to the cutting edge, the chip breaker will change the effective tool rake angle, adversely increasing cutting forces. Accordingly, an optimum positioning of the chip breaker is determined to provide the best tool life improvement by coolant usage. Theoretically, this position should be within the distance range of acceptable chip breaking.

The coolant should be applied in jets of well confined scale to the cutting zone, instead of a mist or flood, in order to minimize fluid consumption. Since the heat is highly localized inside the small tool-chip interface and tool-workpiece interface, the nozzle must be constructed to penetrate the hot spots. A liquid-gas conversion takes place in the nozzle. The liquified gas is jetted with natural pressure from the liquified gas supply source to the small area 20 of the cutting tool tip and the newly forming chip 22 through the nozzle 12. The gas is ejected at a high pressure. For example, normal commercial tank pressure of liquid nitrogen is 240–340 psi as compared to atmospheric pressure of 14.7 psi. The gas pressure could also be increased from that of the normal tank pressure. In addition to liquified nitrogen, other liquified gases may be used. These include, but are not limited to, liquified carbon dioxide, liquified argon. The high pressure jet helps to break and blow the chip away.

Applying the coolant at the proper position serves purposes simultaneously. Absorbing tremendous heat, the high pressure, ultra cold gas jet appears to form a gas/liquid cushion between the forming chip and the tool face which reduces the friction between the two. Meanwhile, the cold temperature enhances the strength and hardness of the cutting tool and increases the brittleness of the chip for easy breaking. The cryogenic nature of the liquified gas effectively removes the heat in the cutting process due to the shortest heat exchange distance possible and the largest temperature difference obtainable. Since the heat generation in cutting and the cooling from cryogenic fluid only occur locally, and are balanced locally in a small region of the tool tip, the process maintains a constant workpiece temperature and has the advantages of avoiding thermal distortion of the workpiece and of maintaining accuracy of cutting.

The nozzle of the present invention is formed by several different methods. It may be formed in part by a hole formed in the chip breaker by using electric discharge machining (EDM) so that three sides of the nozzle are defined by the chip breaker and the fourth side is defined by the tool or the nozzle may be premolded in the chip breaker adjacent the cutting face 16 of the tool as seen in FIG. 3. The nozzle may also be formed by a channel left between the cutting tool and an adjacent tool piece 54, as seen in FIG. 9.

As the cryogenic fluid is supplied only to the area where cutting actually occurs, there is no waste of cooling power to unnecessary or undesirable places. In most cases, the liquid nitrogen, or other cryogenic fluid, cools only the cutting tool. Therefore, the nitrogen consumption is very small and very economical. This enables the cooling of the highest temperature point and prevents waste of the liquified gas. In addition, the cryogenic liquified gas is recycled naturally, since the gases used are derived from the atmosphere.

Figure 7A:
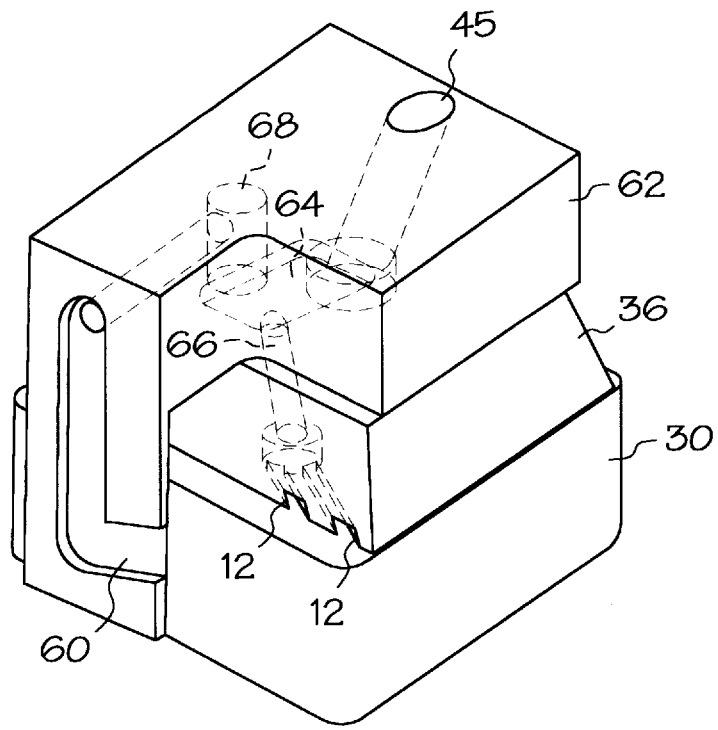
FIGS. 7(a) and 7(b) show the optional dual-nozzle system of the present invention.
Figure 7B:
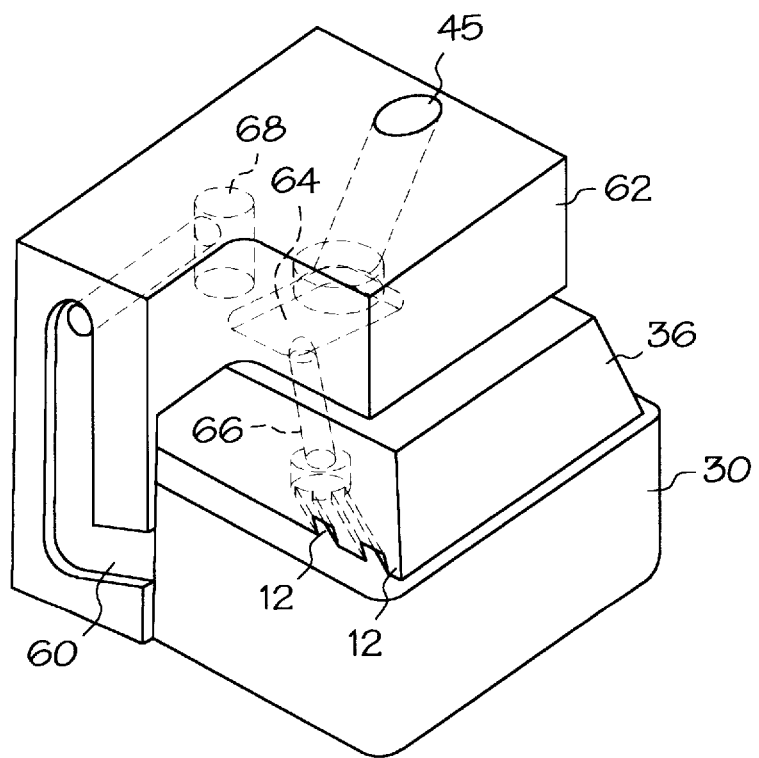
Figure 8:
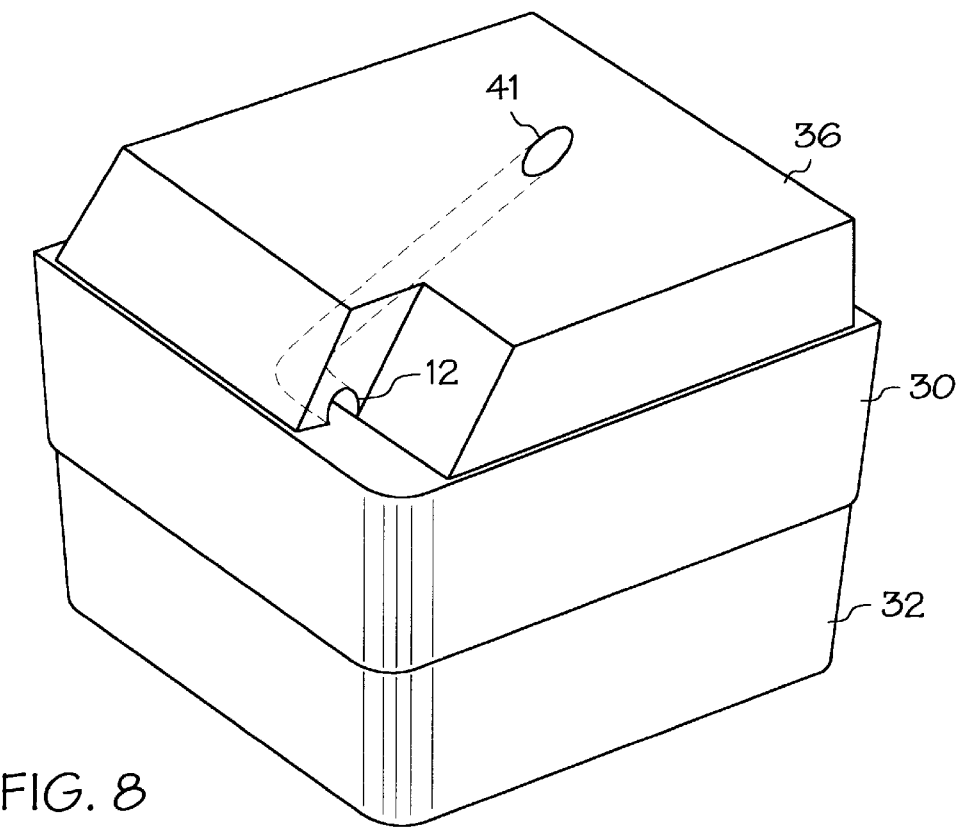
FIG. 8 is an alternative nozzle of the present invention.
Figure 9:
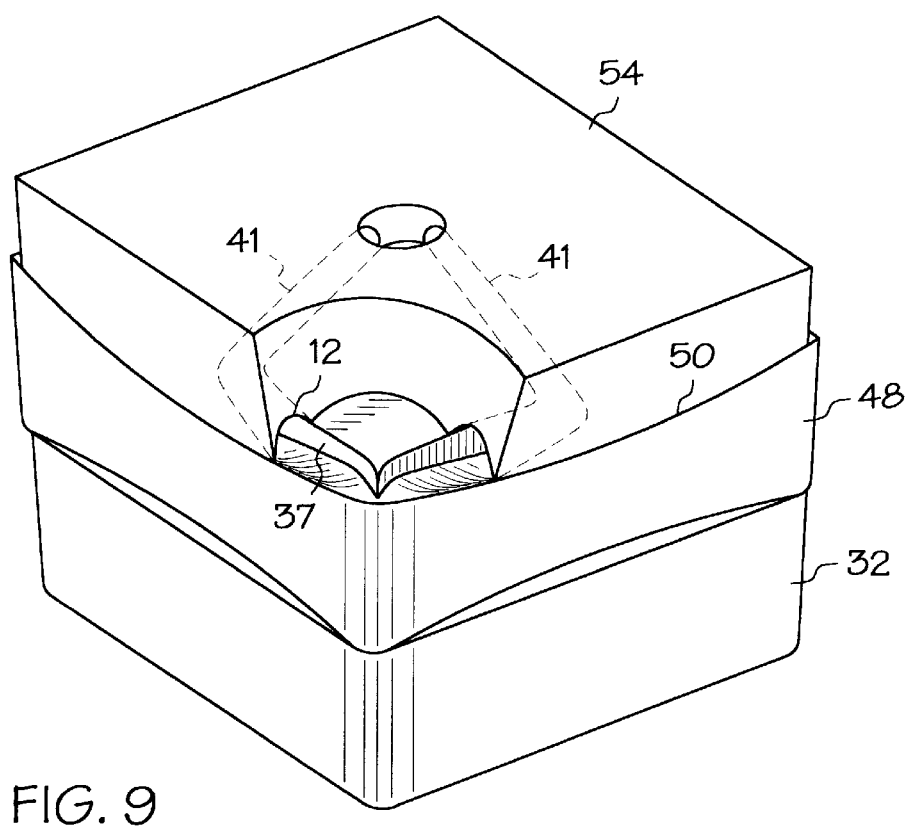
FIG. 9 is an alternative embodiment showing a tool insert having a built-in chip breaker and nozzle formed near the cutting edge.

The chip breaker 36 may be an add-on type such as shown in FIG. 4–8 or an integral type on the tool insert as shown in FIG. 9. The integral chip breaker has a built-in ridge or groove to act as the chip breaker on the top and/or bottom surfaces of the cutting tool. The nozzle 12 may be formed on the tool insert, or on the chip breaker or on an additional attachment adjacent to the cutting edge as will be described herein.

From the heat exchange viewpoint, the majority of the heat acquired during machining is carried away by the chips. About 10%–15% of the power consumed in metal cutting is transmitted to the tool. The workpiece absorbs a minimal amount, about 2%. For a 30 horsepower turning center, the metal cutting power consumption varies from application to application based on temperature, friction and other concerns. In general, however, if the material is harder to cut, a greater amount of horsepower is required. Therefore, a greater amount of liquid nitrogen is required to absorb the increased heat generated during cutting.

The liquid nitrogen can come from a central pipe line or a portable liquid container or dewar. The flow rate can be adjusted by regulating the tank or line pressure, by changing the nozzle dimension, or by adjusting a valve. For example, a nozzle with an orifice of 0.0005–0.0012 square inches, a delivery line length of 8 feet, and a liquid nitrogen source pressure of 200–340 psi, uses a typical flow rate of 0.090–0.375 gallons per minute. This will vary based upon the materials, cutting tool, cutting speed, cutting feed and depth of cut.

Figure 10:
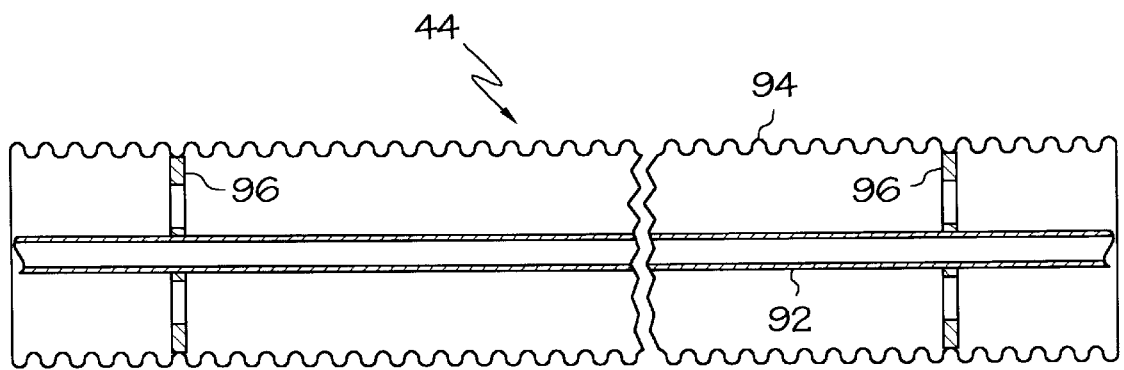
FIG. 10 is a cryogenic delivery line in accordance with the present invention.

The constant flow of liquid nitrogen is important, otherwise the thermostress due to the unsteady heat/cooling cycle may shorten the tool life. To supply the liquid nitrogen to the cutting point with the above-mentioned small flow rate, preferably less than 0.25 gallons per minute, a special vacuum-jacketed delivery line illustrated in FIG. 10 is used to keep the flow steady. This delivery line is incorporated with a lathe or a turning center. The delivery line 44 is constructed by an inner stainless tubing 92 for nitrogen flow, and placed concentrically inside a flexible stainless steel hose 94 spaced by Teflon spacers 96. The spacers are designed so that there is minimal contact area with the tubing for heat transfer. The space between the inner tubing and the outer hose is evacuated to a pressure of about $10^{-6}$ to $10^{-4}$ torr to minimize the convection and conduction of heat transfer. The diameter of the line may be, for example, 3/16, 1/8, or 1/16 inch. The smaller the diameter of the tube, the less area is available for heat transfer. However, the resistance must not become too high such that it blocks the flow of the cryogenic fluid.

Figure 4:
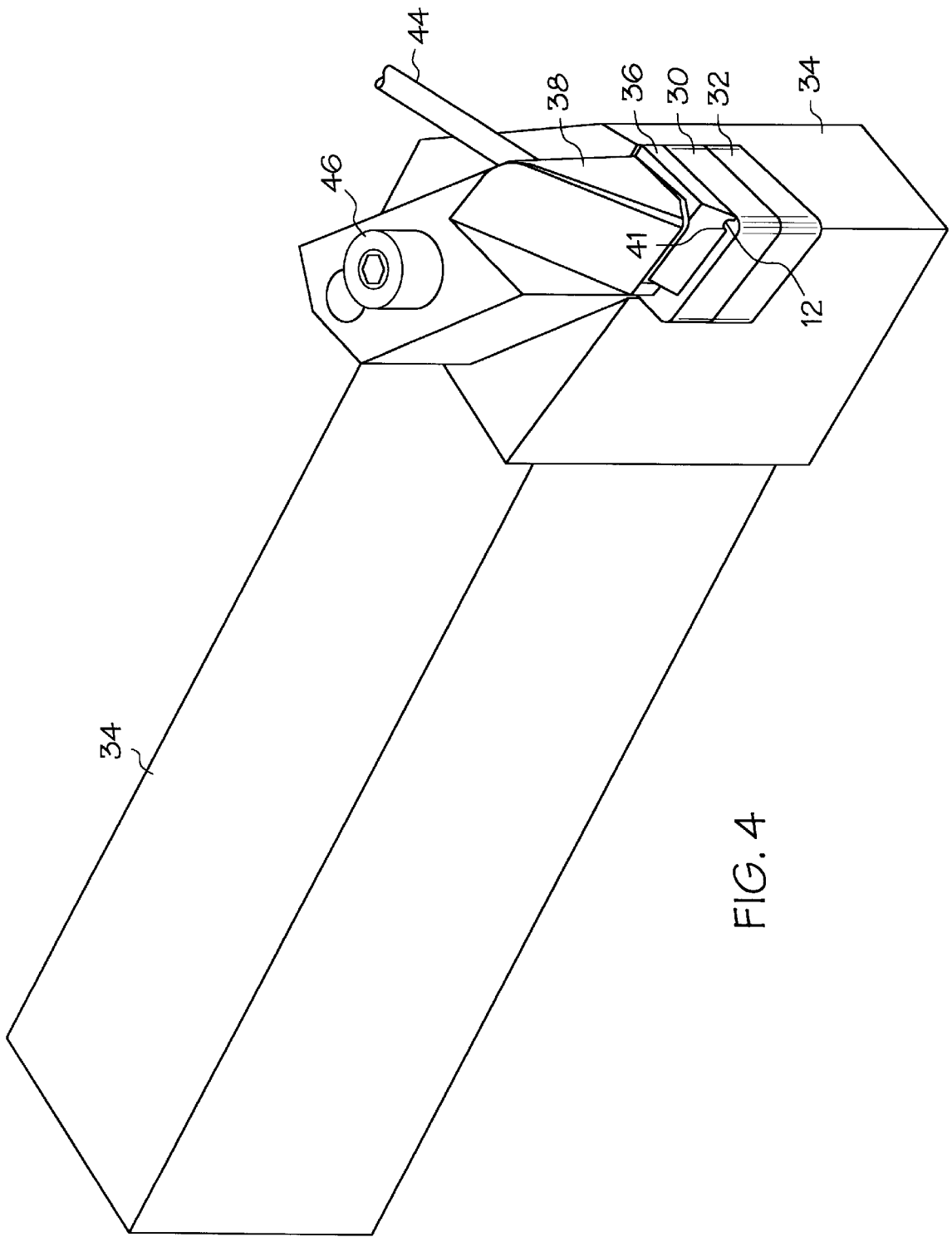
FIG. 4 is a perspective view of the tool holder, the chip breaker and the cryogenic fluid line.
Figure 5:
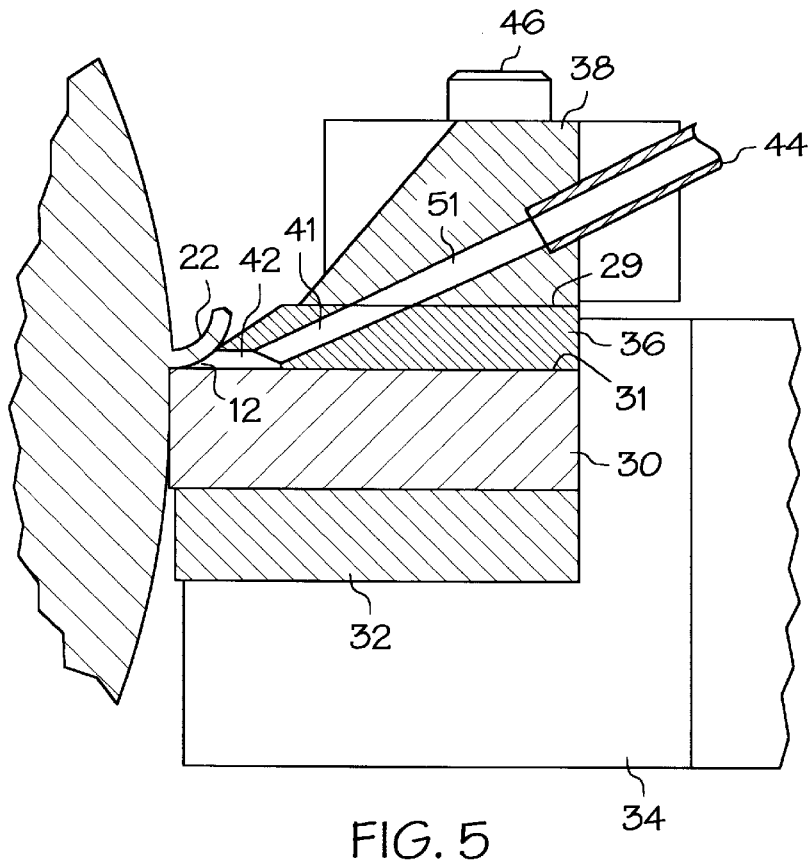
FIG. 5 is a cross sectional view of the present invention.

FIG. 4 and FIG. 5 illustrate a cutting tool of the present invention. Carbide tool insert 30 rests on spacer 32 and tool holder 34 in the cutting machine. The attach-on mechanical chip breaker 36 is provided with a through hole 41 from the center of its top surface 29 to its bottom surface 31. Then, a channel 42 is formed at the foot of the through hole 41 at the bottom surface of chip breaker 36. When chip breaker 36 is clamped down by clamp 38, channel 42 and the top surface of insert 30 form a nozzle 12. This nozzle 12 is directed toward the cutting edge where chip 22 is formed. As shown in FIG. 5, the chip 22 is lifted up by the chip breaker 36, and liquid nitrogen, or other cryogenic fluid, can be injected between the chip and the tool face for effective cooling and lubrication. The nozzle may be in line with the chip flow if the workpiece material tends to generate curly chips, i.e. for titanium. Alternatively, the nozzle can be slightly offset, but still directed towards the cutting edge, as in FIG. 8, so that the chip will be broken by the chip breaker but the forming chip will not block the nozzle and obstruct the flow of the cryogenic fluid. The liquid nitrogen is supplied from vacuum jacketed line 44, which joins clamp 38. The liquid nitrogen flows through internal hole 51 in the clamp, to hole 41 in chip breaker 36, and then flows to nozzle 12. Clamp 38 is held down by screw 46 to the tool holder 34. Preferably, the distance from the nozzle to the cutting edge is approximately 0.045–0.060 inches. The location of the chip breaker/nozzle is critical to the tool life.

Figure 6:
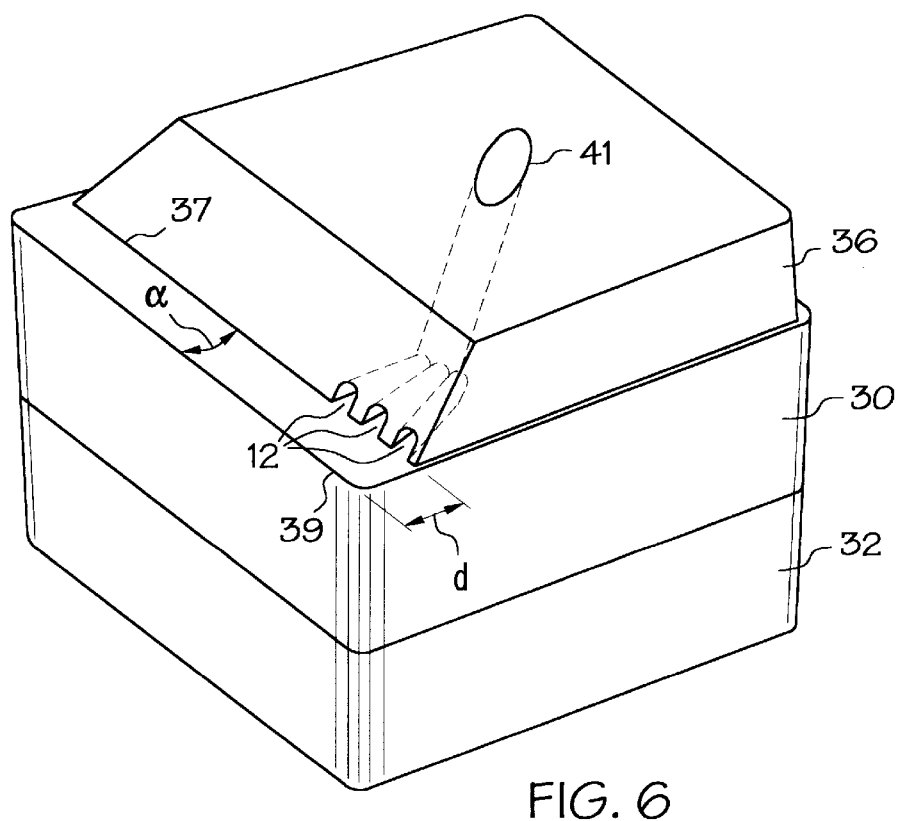
FIG. 6 is an alternative nozzle of the present invention.

Preferably, as shown in FIG. 7(a) and 7(b), this invention uses a dual-nozzle delivery system for direct application of coolant to the heat source spots, i.e. both the tool rake and flank. The primary nozzle 12 (whether singular as 42 in FIG. 5 or split into channels as in FIG. 6 and 7) only cools the rake face (tool-chip interface). The secondary nozzle 60 cools the flank face (tool-workpiece interface).

The tool must allow for positioning of both nozzles 12, 60 close to the tool tip so that it is possible for the coolant jets to be well controlled in direction and shape in order to precisely hit the hot spots. This allows a relatively low coolant flow rate for effective cooling. The secondary nozzle 60 is built into the supply head 62, providing a jet to the flank, if activated. A thermally insulated delivery pipeline (as shown in FIG. 10) is connected with the inlet 45 of the supply head. This leads to an open chamber 64 made on the chip breaker 36. The open chamber 64 is connected by a channel 66 to the primary nozzle 12. Here, the primary nozzle 12 is divided into two channels to better cool rake face.

Activation of this secondary nozzle 60 is optional and depends on the position of the supply head 62 with respect to the chip breaker 36. The tool shown in FIG. 7 is capable of switching easily to the single nozzle system by moving the liquid nitrogen supply head with secondary nozzle 62. In FIG. 7(a) the supply head 62 is positioned so that the bypass channel 68 overlaps the open chamber 64 on the chip breaker, creating a passage from the inlet 44 to the secondary nozzle 60. In the single-nozzle mode, as shown in FIG. 7(b), the supply head 62 is mounted slightly further back so that the bypass channel 68 is separated from the open chamber 64, blocking the entrance of the coolant to the secondary nozzle. Therefore switching between single-nozzle mode FIG. 7(a) and dual-nozzle mode FIG. 7(b) is done by changing the position of the supply head with respect to the chip breaker.

The two nozzles 12, 60 should be designed to deliver the cryogenic jets in such a direction that they penetrate the tool-chip interface (on the rake) and tool-workpiece interface (on the flank), as indicated by the arrows. The primary nozzle 12 divides into two smaller jets at the outlet in order to reduce the flow rate, while remaining capable of covering the total tool-chip contact length along the major cutting edge. The compact size of the delivery system ensures an easy fit into the standard tool holder, without additional geometrical interference with the cutting operation.

Furthermore, as shown in FIG. 6 a tilting angle is made between the chip breaker edge 37 and tool cutting edge 39 so that the coolant jets 12 can fully cover the total tool-chip contact length (along the cutting edge) and strike into this area in a correct direction. Therefore, the position of the chip breaker with respect to the cutting edge is defined by the following two geometrical parameters:

* tilting angle, $\alpha$, between the chip breaker edge and major tool cutting edge
* distance, d, between the chip breaker edge and tool tip Example Tool life tests were carried out for the following cutting conditions:

Workpiece material: Ti-6Al-4V

Depth of cut: 0.05 inches

Feed rate: 0.01 inches

Cutting speed: 200, 300, 400, 500 feet/minute

Machine: CNC Turning Center

Final tool life was determined based on the tool flank wear, as recommended by ASME tool life testing standard of single-point cutting for sintered carbide tools.

In order to determine an optimum position of the chip breaker with the cutting edge, tool wear tests have been done to provide charts of tool wear for different combinations of $\alpha$ and d. It has been found that a position of the chip breaker which demonstrates a slow wear rate at the initial phase of the tool usage tends to provide a longer tool life. Thereby, it suffices to use the initial histories of the maximum or average flank wear for determining a chip breaker position favorable to tool life. Since cutting speed has only a negligible effect on the chip flow direction which partially governs the optimum positioning of the chip breaker, the cutting tests were performed only at a cutting speed of 300 feet/minute. Furthermore, since the position of the chip breaker only influences the jet flow of the primary nozzle, the single-nozzle mode (with the primary nozzle on) was used throughout these cutting tests. For each selected position of the ship breaker a fresh tool insert was used for running the cutting only until the corresponding flank wear was found to be distinguishable from those obtained from other chip breaker positions.

As mentioned in the preceding section, the first requirement for positioning the chip breaker is acceptable chip breaking. It has been observed, from all the past cutting experiments with Ti6–4, that well-broken chips can be obtained if d is between 0.045" and 0.060" and $\alpha$ ranges from 0° to 20° (see FIG. 6). On the other hand, for the present design of the primary nozzle and the cutting depth of 0.05", the tilting angle, $\alpha$ is required to be larger than 10° so that the two fine jets from the primary nozzle can fully cover the tool-chip contact length.

Positions of the chip breaker represented by the combinations of d and $\alpha$ in Table 1 were used in the cutting tests for initial tool wear histories.

TABLE 1

List of Positions of Chip Breaker

| Pos. No. | 1 | 2 | 3 | 4 | 5 | 6 |
|---|---|---|---|---|---|---|
| d | 0.060" | 0.055" | 0.050" | 0.050" | 0.050" | 0.045" |
| α | 15° | 15° | 15° | 20° | 10° | 15° |

Figure 11:
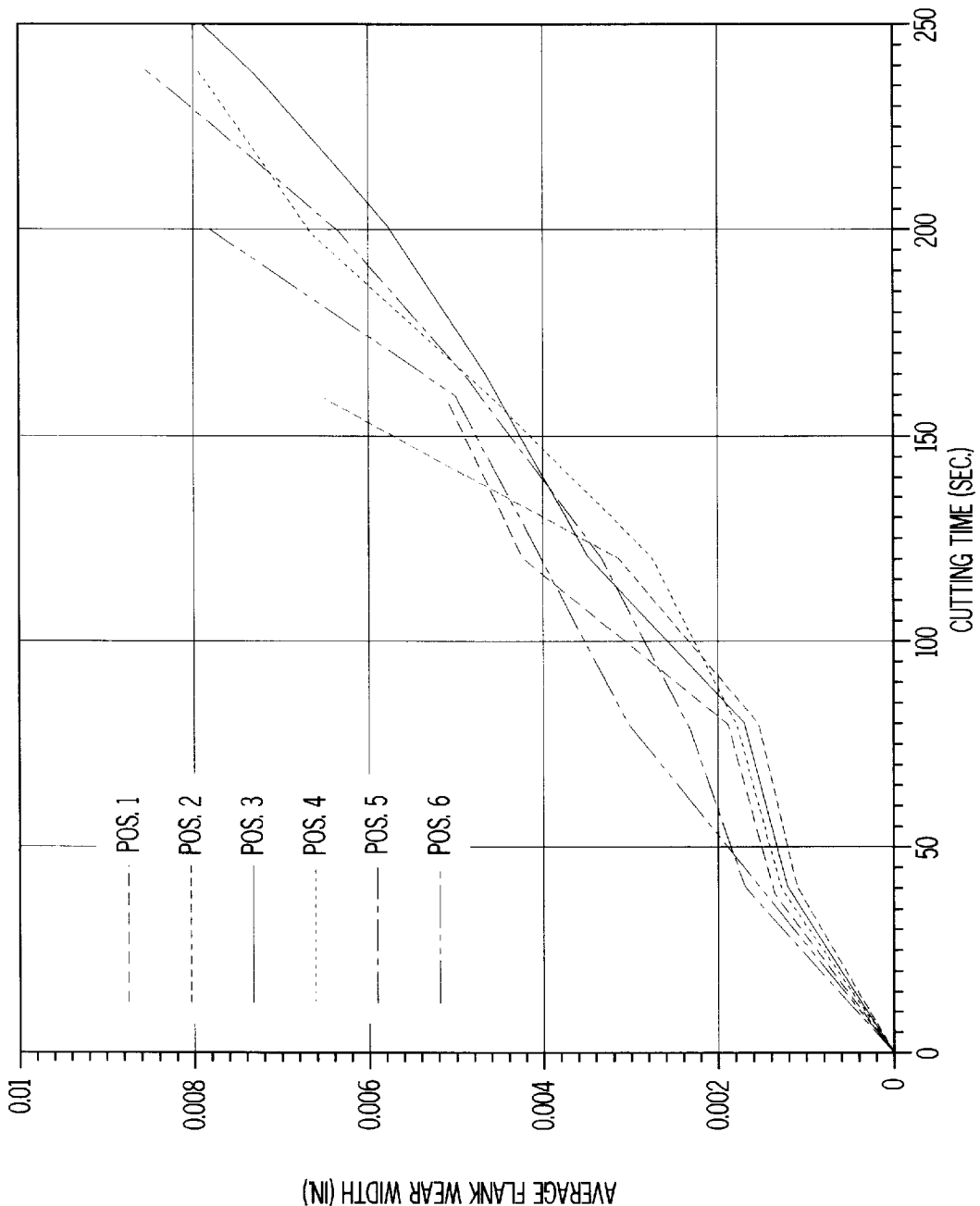
FIG. 11 is a chart showing tool wear verses cutting time.

FIG. 11 shows the tool wear curves scaled in average flank wear, for different positions of the chip breaker at cutting speed of 300 feet/minute. Both Pos. 1 and Pos. 2 led to a high flank wear rate because of the relatively large distance, d, between the chip breaker and the tool edge, which failed to lift up the chip flow from the tool rate. The high flank wear rate for Pos. 6 may be due to the fact that at this position (or closer) the chip tends to block the primary nozzle and the wedge-shaped chip breaker tends to change the effective tool rake angle. Pos. 3, Pos. 4 and Pos. 5 all resulted in comparatively low rates of the maximum flank wear while Pos. 3 also produced the lowest rate of the average flank wear. Tool life at Pos. 3 was 8'37"; at Pos. 4, 7'48"; and 7'21" at Pos. 5.

Figure 12:
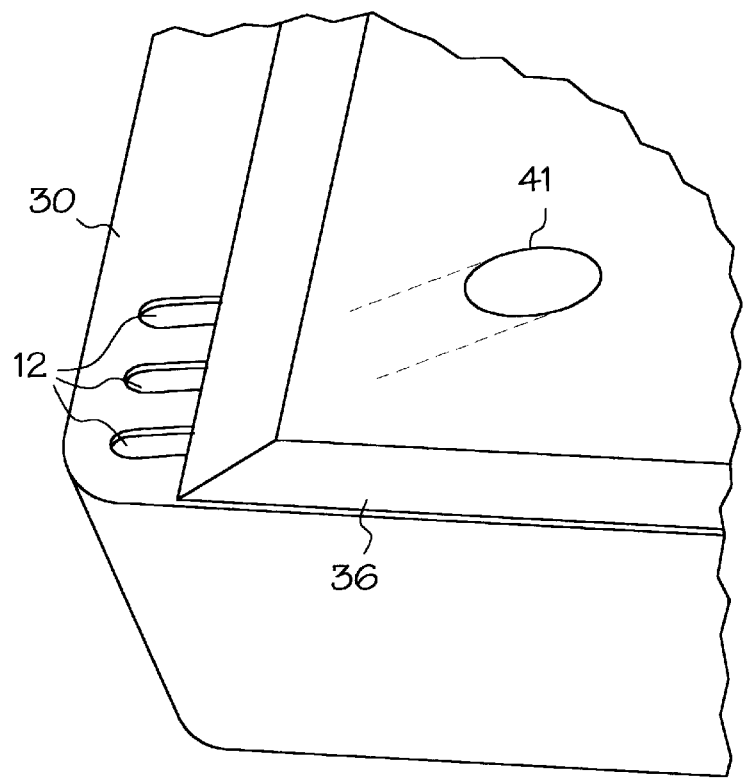
FIG. 12 is a further alternative nozzle of the present invention.

The arrangement and the design of the present invention may vary to adjust to different tools having different workpiece materials, and cutting conditions, and can still attain the same advantages. For example, FIG. 6 illustrates that the nozzle 12 may fan out, such as in the 3-channel design shown. Also, the nozzle channels may be formed on the tool insert 30 instead of on the chip breaker 36 as shown in FIG. 12. For machining highly ductile material, such as low carbon steel 1008, the nozzle 12 may be positioned to emit the cryogenic fluid from the side of the chip breaker 36 as shown in FIG. 8. In such cases, the chip is still lifted up by an obstruction chip breaker to help the liquid nitrogen penetrate between the chip and the tool face. For an apparatus having a formed insert 48 with a built-in chip breaker 37, as in FIG. 9, the nozzle 12 can be formed from the top surface insert 50 and a nozzle piece 54. The fluid can then be directed to the sides of the chip.

Advantages of using the present invention include reduction in tool wear, reduction in tool cost, and increase in tool life as shown by the following Table 2. Table 2 shows percent increased tool life using the present invention as compared to conventional machining of the following steel and titanium alloys.

TABLE 2

| Material Machined | Feed (inches) | Feed (ft/min) | Increased Tool Life (%) |
|---|---|---|---|
| AISI 1070 | .010 | 680 | 164% |
| AISI 1070 | .025 | 500 | 255% |
| TITANIUM 6-4 | .010 | 300 | 195% |
| AISI 52100 | .010 | 1050 | 117% |
| AISI 1008 | .015 | 2200 | 156% |
| AISI 1008 | .015 | 1800 | 128% |

Other advantages achieved using the present invention include an increase in cutting speed, reduction in manufacturing time, and reduction in manufacturing cost, as well as reduction in friction force, increase in cutting efficiency, and reduction in power consumption. Improvement in the work surface quality, elimination of burns and chemical damage from cutting oil, and the reduction of rough surfaces caused by the breakdown of the built-up edge are added advantages. In addition, the invention provides reduction in workpiece distortion, dimensional change for precision machine as well as improvement in chip breaking and removal, maintenance of a clean operation without environmental hazard, and no need to clean workpieces after cutting.

Cutting tests of full tool life for machining Ti6–4 have been completed for the following cooling approaches:

* Standard single-nozzle mode (primary nozzle on alone) at cutting speed of 300 feet/minute

* Secondary nozzle on alone (primary nozzle temporarily blocked) at cutting speed of 300 feet/minute

* Dry cutting (without any coolant) at cutting speed of 300 feet/minute

* Dual-nozzle mode (primary nozzle and secondary nozzle both on) at cutting speeds of 200, 300, 400, 500 feet/minute

TABLE 3

Tool Life for Different Cooling Conditions (V = 300 ft/min)

| | Dry | Emulsion | Dual Nozzle | Primary Only | Secondary Only |
|---|---|---|---|---|---|
| Tool Life | 2'47" | 4'50" | 15'48" | 8'37" | 3'58" |
| $N_2$ Flow | N/A | N/A | 0.215 GPM | 0.165 GPM | 0.140 GPM |

Table 3 presents the tool life data for various cooling approaches. It was seen that if only the secondary nozzle is on (i.e. with the primary nozzle intentionally blocked in dual nozzle mode), the corresponding tool life is even lower than that achieved for conventional emulsion. This is due to the fact that the application of coolant jet to the tool flank alone cannot effectively remove the tool-chip interface heat, which is the most intense of the three major heat sources. On the other hand, the standard single-nozzle mode (with the primary nozzle on) led to a significant tool life improvement over the dry cutting or emulsion cooled cutting.

Compared to the single-nozzle mode, the dual-nozzle mode makes up the best cooling approach for cryogenic machining of Ti6–4 and yields an 93% increase in the tool life at a cost of only a 30% increase in coolant flowrate. This also suggests that the single-nozzle mode is economically preferable for lower cutting speeds at which the increased coolant usage cost may surpass the gain from the improved tool life.

In summary, the method of extending the cutting tool life is achieved through the combination of the following mechanisms: a) reducing the abrasion wear by using a lubrication film provided by the cryogenic fluid, b) reducing the abrasion wear by enhancing the hardness of the tool face due to the cryogenically cooled temperature, c) reducing the adhesion wear by reducing the build-up edge, and d) reducing the diffusion wear with the use of low temperatures since the chemical/atomic diffusion rate is an exponential function of temperature.

Table 4 shows that for the same feed rate, cutting speed, cutting depth and time, the tool life for emulsion (flood) cooling is 4'83", for the primary nozzle alone the tool life is 9'11", and for the dual nozzle system the tool life is 15'48". The hourly yield increases from 9.9 pieces machined per hour to 11.9 for a single nozzle and to 12.9 pieces per hour for a dual nozzle. This relates to a 20.2% increase in productivity using a single nozzle and 30.3% increase in using a dual nozzle system.

TABLE 4

Parts Cost & Productivity Analysis
For Machining Ti6-4(300 sfm)
Materials; Ti6-4, Feedrate: 0.01", Cutting speed: 300 sfm,
Cooling approach: two nozzles on and one nozzle on

|  | Emulsion | 1 nozzle | 2 nozzles |
| --- | --- | --- | --- |
| Cutting Condition: | | | |
| Feedrate (in) | 0.01" | 0.01" | 0.01" |
| Cutting speed (sfm) | 300 | 300 | 300 |
| Tool life T (min) | 4.83(4'50") | 9.11(9'07") | 15.80(15'48") |
| Workpiece: | | | |
| Cutting depth | 0.05" | 0.05" | 0.05" |
| Cutting length | 20" | 20" | 20" |
| Part diameter | 2" | 2" | 2" |
| Machining time: | | | |
| Spindle speed (rpm sfm × 3.82/D) | 573 rpm | 573 rpm | 573 rpm |
| Cutting time ($T_c$ = 20"/(0.01 × rpm)) | 3.490 min | 3.490 min | 3.490 min |
| Load and Unload time for parts (Tl) | 0.4 min/ea | 0.4 min/ea | 0.4 min/ea |
| Parts No. per tool life n (n = T/Tc) | 1.385 pcs | 2.612 pcs | 3.954 pcs |
| Tool change time/part (Tct = 3 min/n) | 2.166 min | 1.149 min | 0.759 min |
| Cycle time per part Tp = Tc + Tl + Tct | 6.056 min | 5.039 min | 4.649 min |
| Hourly yield | 9.908 pcs/hr | 11.907 pcs/hr | 12.906 pcs/hr |
| Machining cost: | | | |
| Operator/machine rate (M) | $52.70/hr | $53.03/hr | $53.03/hr |
| Machine & operator cost/part (M × Tp ÷ 60) | $5.319/ea | $4.454/ea | $4.109/ea |
| Tool cost per part ($8.40 ÷ 4 ÷ n) | $1.516/ea | $0.804/ea | $0.531/ea |
| Coolant cost ($ cost/hr × Tc ÷ 60 for cryo cutting, and $ cost/hr × Tp ÷ 60 for emulsion) | $0.336/part | $0.156/part | $0.209/part |
| Total Cost per Part | $7.171/ea | $5.414/ea | $4.849/ea |
| Cost Reduction | | $1.615 savings per part | $2.18 savings per part! |
| Annual Production Quantity (2112 hrs × 60 ÷ Tp) | 20925 pcs/yr | 25148 pcs/yr | 27257 pcs/yr |
| Productivity Gain (compared to emulsion) | | 20.2% increase in productivity | 30.3% increase in productivity |

At cutting speeds of 400 sfm, the dual nozzle system gives a 46.5% increase in machine capacity. At 500 sfm the productivity gain is 146% as compared to emulsion cooling.

Having described the invention in detail and by reference to preferred embodiments thereof, it will be apparent that modifications and variations are possible without departing from the scope of the invention defined in the appended claims.

What is claimed is:

1. An apparatus for cutting chips from a workpiece comprising:

a cryogenic coolant;

a cutting tool having a rake face and a flank face, said rake face including a cutting edge, a discrete area of said rake face being subject to a higher temperature than any other areas of said rake face during said cutting of said workpiece;

a chip breaker adjacent to said rake face for lifting a chip from said rake face of said cutting tool; and a primary nozzle formed by at least one nozzle channel recessed into said rake face and extending from beneath said chip breaker toward said discrete area of said rake face for directing said cryogenic coolant onto said rake face and under said chip cut from said workpiece;

wherein said primary nozzle and said chip breaker cooperate such that said chip breaker lifts said chip and said primary nozzle directs said cryogenic coolant under said chip to said discrete area of said rake face, and said cryogenic coolant is directed between said chip and said cutting tool, and a supply head positioned adjacent said chip breaker for providing cryogenic coolant to said through hole of said chip breaker, and a secondary nozzle formed on a portion of said supply head which extends adjacent said flank face of said cutting tool.

2. An apparatus for cutting chips from a workpiece, comprising:

a cutting tool having a rake face and a flank face, said rake face including a cutting edge;

a chip breaker positioned adjacent said rake face for lifting a chip from said rake face after the chip is cut from the workpiece;

a supply head positioned adjacent said chip breaker such that a chamber for receiving cryogenic coolant is formed between said supply head and said chip breaker;

a primary nozzle for directing cryogenic coolant from said chamber onto said rake face and under the chip cut from the workpiece, said primary nozzle positioned about 0.045 to about 0.060 inches from said cutting edge of said cutting tool;

a secondary nozzle positioned adjacent said flank face of said cutting tool for directing cryogenic coolant from said chamber onto said flank face of said cutting tool; and wherein access of said secondary nozzle to cryogenic coolant from said chamber is determined by movement of said supply head between first and second positions with respect to said chip breaker.

3. The apparatus of claim 2 wherein said primary nozzle is formed between said rake face and said chip breaker.

4. The apparatus of claim 2 wherein said secondary nozzle is formed on a portion of said supply head which extends adjacent said flank face of said cutting tool, said supply head including a bypass channel having a first side which is positioned adjacent said chip breaker and a second side which communicates with said secondary nozzle.

5. An apparatus for cutting chips from a workpiece, comprising:

a cutting tool having a rake face and a flank face, said rake face including a cutting edge;

a chip breaker positioned adjacent said rake face for lifting a chip from said rake face after the chip is cut from the workpiece;

a supply head positioned adjacent said chip breaker for directing cryogenic coolant to said chip breaker;

a primary nozzle formed between said rake face and said chip breaker for directing cryogenic coolant from said supply head onto said rake face and under the chip cut from the workpiece;

a secondary nozzle positioned adjacent said flank face of said cutting tool for directing cryogenic coolant from said supply head onto said flank face of said cutting tool; and wherein access of said secondary nozzle to cryogenic coolant from said supply head is determined by movement of said supply head between first and second positions with respect to said chip breaker.

6. The apparatus of claim 5 wherein said primary nozzle is formed between said rake face and said chip breaker.

7. The apparatus of claim 5 wherein said secondary nozzle is formed on a portion of said supply head which extends adjacent said flank face of said cutting tool, said supply head including a bypass channel one side of which is positioned adjacent said chip breaker and the other side of which communicates with said secondary nozzle.

8. An apparatus for cutting chips from a workpiece, comprising:

a cutting tool having a rake face and a flank face, said rake face including a cutting edge;

a chip breaker adjacent to said rake face for lifting a chip from said rake face of said cutting tool after the chip is cut from the workpiece;

a primary nozzle formed by at least one nozzle channel recessed into said rake face and extending from beneath said chip breaker toward said cutting edge of said rake face for directing a cryogenic coolant onto said rake face and under the chip cut from the workpiece;

wherein said chip breaker includes a through hole which extends to said nozzle channel for providing cryogenic coolant to said nozzle channel;

a supply head positioned adjacent said chip breaker for providing cryogenic coolant to said through hole of said chip breaker; and a secondary nozzle positioned adjacent said flank face of said cutting tool for directing cryogenic coolant onto said flank face.

9. The apparatus of claim 8, wherein said supply head includes a portion which extends adjacent said flank face of said cutting tool, and wherein said secondary nozzle is formed on said portion of said supply head.

* * * * *